(12) United States Patent
Sambhwani

(10) Patent No.: US 8,737,374 B2
(45) Date of Patent: May 27, 2014

(54) SYSTEM AND METHOD FOR PACKET ACKNOWLEDGMENT

(75) Inventor: Sharad D. Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 503 days.

(21) Appl. No.: 12/652,658

(22) Filed: Jan. 5, 2010

(65) Prior Publication Data

US 2010/0202348 A1 Aug. 12, 2010

Related U.S. Application Data

(60) Provisional application No. 61/142,836, filed on Jan. 6, 2009.

(51) Int. Cl.
*H04B 7/216* (2006.01)

(52) U.S. Cl.
USPC .......................................... 370/342; 370/335

(58) Field of Classification Search
USPC ................................. 370/320, 335, 342, 441
See application file for complete search history.

(56) References Cited

U.S. PATENT DOCUMENTS

| | | | |
|---|---|---|---|
| 7,889,696 B2 * | 2/2011 | Choi et al. ................... | 370/330 |
| 7,924,776 B2 * | 4/2011 | Yoon et al. ................... | 370/328 |
| 2003/0123396 A1 | 7/2003 | Seo et al. | |
| 2004/0022213 A1 | 2/2004 | Choi et al. | |
| 2004/0190486 A1 * | 9/2004 | Oshiba ......................... | 370/349 |
| 2006/0274712 A1 | 12/2006 | Malladi et al. | |
| 2007/0011589 A1 | 1/2007 | Palanki | |
| 2009/0003420 A1 | 1/2009 | Wu et al. | |
| 2010/0157932 A1 * | 6/2010 | Chun et al. ................... | 370/329 |
| 2010/0202348 A1 * | 8/2010 | Sambhwani .................. | 370/328 |
| 2011/0113299 A1 * | 5/2011 | Power et al. .................. | 714/748 |
| 2013/0242948 A1 | 9/2013 | Sambhwani | |

FOREIGN PATENT DOCUMENTS

| | | |
|---|---|---|
| EP | 1313232 | 5/2003 |
| EP | 1463230 A2 | 9/2004 |
| EP | 2077677 | 7/2009 |
| EP | 2159930 | 3/2010 |
| WO | WO2006138570 | 12/2006 |
| WO | WO2008041932 | 4/2008 |
| WO | WO2008092303 | 8/2008 |
| WO | WO2008111808 | 9/2008 |
| WO | WO2008115837 | 9/2008 |
| WO | WO2009120797 | 10/2009 |

OTHER PUBLICATIONS

3GPP TR 25.814 V7.1.0 (Sep. 2006) 3rd Generation Partnership Project; Technical Specification Group Radio Access Network; Physical layer aspects for evolved Universal Terrestrial Radio Access (UTRA) (Release 7), 3GPP-Standards, 2500 Wilson Boulevard, Suite 300, Arlington, Virginia 22201 USA, Sep. 1, 2006, XP040282759 see 9.3.2.4 (p. 100) t o 9.3.3.1 (p. 102).

(Continued)

*Primary Examiner* — Thai Hoang
(74) *Attorney, Agent, or Firm* — Charles Chesney

(57) ABSTRACT

Systems and methods for packet acknowledgement are disclosed. In one embodiment, codewords are redundantly used in order to decrease the total number of bits required for feeding back acknowledgment information or in order to increase the Euclidean space between codewords.

21 Claims, 13 Drawing Sheets

(56) References Cited

OTHER PUBLICATIONS

Ericsson: "On the HS-DPCCH structure for Dual-Cell HSDPA operation" 3GPP Draft; RI-083975 HS-DPCCH for DC-HSDPA, 3RD Generation Partnership Project (3GPP), Mobile Competence Centre; 650, Route Des Lucioles; F-06921 Sophia-Antipolis Cedex; France, no. Prague, Czech Republic; Oct. 6, 2008, XP050317278.

Ericsson: "On the HS-DPCCH structure for Dual-Cell HSDPA operation" 3GPP Draft; RI-0a3592 HS-DPCCH for DC-HSDPA. 3RD Generation Partnership Project (3QPP), Mobile Competence Centre ; 650. Route Des Lucioles; F-06921 Sophia-Antipolis Cedex; France, no. Prague, Czech Republic; Sep. 24, 2008. XP050316953.

Huawei: "Discussion on the HS-DPCCH HARQ-ACKs for Dual-Cell HSDPA Operation" 3GPP Draft; RI-084179 Discussion on the HARQ-ACKS for Dual-Cell HSDPA, SRD Generation Partnership Project (36PP), Mobile Competence Centre; 650. Route Des Lucioles; F-06921 Sophia-Antipolis Cedex; France, no. Prague, Czech Republic; Nov. 5, 2008, XP050317471.

International Search Report and Written Opinion—PCT/US2010/020270, International Search Authority—European Patent Office—Oct. 18, 2010.

Partial International Search Report—PCT/US2010/020270—International Search Authority, European Patent Office,Jul. 28, 2010.

Qualcomm Europe: "Analysis of different ACK/NACK coding schemes for DC-HSDPA" 3GPP Draft; RI-084501, 3R0 Generation Partnership Project (3GPP), Mobile Competence Centre; 650, Route Des Lucioles; F-06921 Sophia-Antipolis Cedex; France, no. Prague, Czech Republic; Nov. 9, 2008, XP050317753.

Qualcomm Europe: "HS-DPCCH design f o r DC-HSDPA and MIMO" 3GPP Draft; R1-091599-HS-DPCCH-DC-HSDPA-MIMO, 3RD Generation Partnership Project (3GPP), Mobile Competence Centre; 650, Route Des Lucioles; F-06921 Sophia-Antipolis Cedex France, no. Seoul, Korea; is Mar. 2009 (Mar. 28, 2009), XP050339145.

Sharp: "Improved Flexibility/Performance CQI+ACK/NACK coding in the E-UTRA uplink" 3GPP TSG-RAN WGI 50; Aug. 20, 2007-Aug. 24, 2007, [Online] vol. TSG-RAN WGI 50, No. RI-073321, pp. 1-7, XP002521427.

Qualcomm Europe, "Extensions to DC-HSDPA", 3GPP TSG-RAN WG1 #55, R1-084105, 3GPP TSG-RAN WG1 #55, Nov. 10-14, 2008, internet< URL:http://www.3gpp.org/ftp/tsg_ran/WG1_RL1/TSGR1_55/Docs/R1-084105.zip>.

European Search Report—EP12166868—Search Authority—The Munich—Jun. 18, 2012.

Qualcomm Europe: "Single Code HS-DPCCH ACK/NACK Design for DC-HSDPA", 3GPP TSG-RAN WG1#54b, R1-083961, Oct., 2008.

\* cited by examiner

| Tx | CL 1 | CL 2 | # Codewords |
|----|------|------|-------------|
| A  | 0    | 0    | 0           |
| B  | 0    | 1    | 2           |
| C  | 1    | 0    | 2           |
| D  | 1    | 1    | 4           |
| E  | 2    | 0    | 4           |
| F  | 2    | 1    | 8           |

FIG. 2

| | |
|---|---|
| 0 | No packets detected |
| 1 | One packet detected on CL2 (ACK) |
| 2 | One packet detected on CL2 (NACK) |
| 3 | One packet detected on CL1 (ACK) |
| 4 | One packet detected on CL1 (NACK) |
| 5 | Two packets detected on CL1 (ACK/ACK) OR<br>One packet detected on CL1 (ACK) and one packet detected on CL2 (ACK) |
| 6 | Two packets detected on CL1 (ACK/NACK) OR<br>One packet detected on CL1 (ACK) and one packet detected on CL2 (NACK) |
| 7 | Two packets detected on CL1 (NACK/ACK) OR<br>One packet detected on CL1 (NACK) and one packet detected on CL2 (ACK) |
| 8 | Two packets detected on CL1 (NACK/NACK) OR<br>One packet detected on CL1 (NACK) and one packet detected on CL2 (NACK) |
| 9 | Two packets detected on CL1 (ACK/ACK) and one packet detected on CL2 (ACK) |
| 10 | Two packets detected on CL1 (ACK/NACK) and one packet detected on CL2 (ACK) |
| 11 | Two packets detected on CL1 (NACK/ACK) and one packet detected on CL2 (ACK) |
| 12 | Two packets detected on CL1 (NACK/NACK) and one packet detected on CL2 (ACK) |
| 13 | Two packets detected on CL1 (ACK/ACK) and one packet detected on CL2 (NACK) |
| 14 | Two packets detected on CL1 (ACK/NACK) and one packet detected on CL2 (NACK) |
| 15 | Two packets detected on CL1 (NACK/ACK) and one packet detected on CL2 (NACK) |
| 16 | Two packets detected on CL1 (NACK/NACK) and one packet detected on CL2 (NACK) |

FIG. 3

| Tx | CL 1 | CL.2 | # Codewords |
|---|---|---|---|
| G | 0 | 0 | 0 |
| H | 0 | 1 | 2 |
| I | 0 | 2 | 4 |
| J | 1 | 0 | 2 |
| K | 1 | 1 | 4 |
| L | 1 | 2 | 8 |
| M | 2 | 0 | 4 |
| N | 2 | 1 | 8 |
| O | 2 | 2 | 16 |

FIG. 5

0 No packets detected
1 One packet detected on CL2 (ACK)
2 One packet detected on CL2 (NACK)
3 Two packets detected on CL2 (ACK/ACK)
4 Two packers detected on CL2 (ACK/NACK)
5 Two packets detect on CL2 (NACK/ACK)
6 Two packets detect on CL2 (NACK/NACK)
7 One packet detected on CL1 (ACK)
8 One packet detected on CL1 (NACK)
9 Two packets detected on CL1 (ACK/ACK) OR
  One packet detected on CL1 (ACK) and one packet detected on CL2 (ACK)
10 Two packets detected on Cl1 (ACK/NACK) OR
  One packet detected on CL1 (ACK) and one packet detected on CL2 (NACK)
11 Two packets detected on CL1 (NACK/ACK) OR
  One packet detected on CL1 (NACK) and one packet detected on CL2 (ACK)
12 Two packets detected on CL1 (NACK/NACK) OR
  One packet detected on CL1 (NACK) and one packet detected on CL1 (NACK)
13 Two packets detected on CL1 (ACK/ACK) and two packets detected on CL2 (ACK/ACK) OR
  One packet detected on CL1 (ACK) and two packets detected on CL1 (ACK) and two packets detected on CL2 (ACK/ACK) OR
  Two packets detected on CL1 (ACK/ACK) and one packet detected on CL2 (ACK)
14 Two packets detected on CL1 (ACK/ACK) and two packets detected on CL2 (ACK/NACK) OR
  One packet detected on CL1 (ACK) and two packets detected on CL2 (ACK/NACK) OR Two packets detected on CL1 (ACK/ACK) and one packet detected on CL2 (NACK)
15 Two packets detected on CL1 (ACK/ACK) and two packets detected on CL2 (NACK/NACK) OR
  One packet detected onCL1 (ACK) and two packets detected on CL2 (NACK/ACK) OR Two packets detected on CL1 (ACK/NACK) and one packet detected on CL2 (ACK)
16 Two packets detected on CL1 (ACK/ACK) and two packets detected on CL2 (NACK/NACK) OR
  One packet detected on CL1 (ACK) and two packets detected on CL2 (NACK/NACK) OR
  Two packets detected on CL1 (ACK/NACK) and one packet detected on CL2 (NACK)
17 Two packets detected on CL1 (ACK/NACK) and two packets detected on CL2 (ACK/ACK) OR
  One packet detected on CL1 (NACK) and two packets detected on CL2 (ACK/ACK) OR Two packets detected on CL1 (NACK/ACK) and one packet detected on CL2 (ACK)

FIG. 6

18 Two packets detected on Cl1 (ACK/NACK) and two packets detected on CL2 (ACK/NACK) OR
One packet detected on CL1 (NACK) and two packets detected on CL2 (AACK/NACK) OR
Two packets detected on CL1 (NACK/ACK) and one packet detected on CL2 (NACK)

19 Two packets detected on CL1 (ACK/NACK) and two packets detected on CL2 (NACK/ACK) OR
One packet detected on CL1 (NACK) and two packets detected on CL2 (NACK/ACK) OR
Two packets detected on CL1 (NACK/NACK) and one packet detected on CL2 (ACK)

20 Two packets detected on CL1 (ACK/NACK) and two packets detected on CL2 (NACK/NACK) OR
One packet detected on CL1 (NACK) and two packets detected on CL2 (NACK/NACK) OR
Two packets detected on CL1 (NACK/NACK) and one packet detected on CL2 (NACK)

21 Two packets detected on CL1 (NACK/ACK) and two packets detected on CL2 (ACK/ACK)

22 Two packets detected on CL1 (NACK/ACK) and two packets detected on CL2 (ACK/NACK)

23 Two packets detected on CL1 (NACK/ACK) and two packets detected on CL2 (NACK/ACK)

24 Two packets detected on CL1 (NACK/ACK) and two packets detected on CL2 (NACK/NACK)

25 Two packets detected on CL1 (NACK/NACK) and two packets detected on CL2 (ACK/ACK)

26 Two packets detected on CL1 (NACK/NACK) and two packets detected on CL2 (ACK/NACK)

27 Two packets detected on CL1 (NACK/NACK) and two packets detected on CL2 (NACK/ACK)

28 Two packets detected on CL1 (NACK/NACK) and two packets detected on CL2 (NACK/NACK)

FIG. 6
(Continued)

SYSTEM AND METHOD FOR PACKET ACKNOWLEDGMENT

CROSS-REFERENCE TO RELATED APPLICATIONS

This application claims priority under 35 U.S.C. §119(e) to U.S. Provisional Patent App. No. 61/142,836 filed Jan. 6, 2009, which is herein incorporated by reference in its entirety.

BACKGROUND

1. Field

The disclosure relates to the feedback of acknowledgement information in a digital communication system.

2. Description of the Related Technology

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on one or more forward and reverse links. A forward link (or downlink) refers to the communication link from the base stations to the terminals, and a reverse link (or uplink) refers to the communication link from the terminals to the base stations. These communication links may be established via a single-in-single-out (SISO), multiple-in-single-out (MISO), or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are within the same frequency region so that the reciprocity principle allows the estimation of the forward link channel from the reverse link channel. This enables the access point to extract transmit beamforming gain on the forward link when multiple antennas are available at the access point.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide for packet acknowledgment.

One aspect is a method of transmitting an acknowledgment codeword, the method comprising detecting a first number of packets on a first communication link between a user device and a base station, detecting a second number of packets on a second communication link between the user device and the base station, determining, for each of the first number of packets and for each of the second number of packets, whether to acknowledge the packet, selecting, based on the acknowledgment determinations, a codeword from a codebook, the codebook comprising a set of codewords for acknowledging or not-acknowledging each of the first number of packets on the first communication link and the second number of packets on the second communication link, wherein the same set of codewords is also used for acknowledging or not-acknowledging each of a third number of packets on the first communication link and a fourth number of packets on the second communication link, the third number being different from the first number, the fourth number being different from the second number, and the sum of the first and second numbers being the same as the sum of the third and fourth numbers, and transmitting the selected codeword from the user device to the base station.

Another aspect is a user device comprising a memory configured to store an acknowledgement codebook comprising a plurality of acknowledgment codewords, a receiver configured to receive a first number of packets via a first communication link between a base station and the user device and to receive a second number of packets via a second communication link between the base station and the user device, the sum of the first and second numbers equal to a third number, a processor configured to select one of the codewords based on the received packets and the third number, irrespective of the first and second numbers, and a transmitter configured to transmit the selected codeword to the base station.

Another aspect is a user device comprising a receiver configured to receive, over a number (K) of active communication links between a base station and the user device, a maximum number ($p_1, p_2, \ldots, p_K$) of packets on each of the active communication links, a memory configured to store an acknowledgment codebook having a number (C) of codewords, wherein $$C < \left(\prod_{j=1}^{K} \sum_{i=0}^{p_j} 2^i\right) - 1,$$

a processor configured to detect a number of packets on each of the active communication links, to determine whether to acknowledge each of the detected packets, and to select one of the codewords based at least in part on the determined acknowledgments, and a transmitter configured to transmit the selected codeword to the base station.

A user device comprising means for receiving, over a number (K) of active communication links between a base station and the user device, a maximum number ($p_1, p_2, \ldots, p_K$) of packets on each of the active communication links, means for storing an acknowledgment codebook having a number (C) of codewords, wherein $$C < \left(\prod_{j=1}^{K} \sum_{i=0}^{p_j} 2^i\right) - 1,$$

means for detecting a number of packets on each of the active communication links, to determine whether to acknowledge each of the detected packets, means for selecting one of the codewords based at least in part on the determined acknowledgments, and means for transmitting the selected codeword to the base station.

Another aspect is a method of transmitting an acknowledgment codeword, the method comprising detecting a number of packets on each of a number (K) of active communication links between a base station and a user device, each active communication link having associated therewith a maximum number ($p_1, p_2, \ldots, p_K$) of packets, determining, for each detected packet, whether to acknowledge the packet, selecting, based on the determined acknowledgments, a codeword from a codebook having a number (C) of codewords, wherein $$C < \left( \prod_{j=1}^{K} \sum_{i=0}^{p_j} 2^i \right) - 1,$$

and transmitting the selected codeword from the user device to the base station.

Another aspect is a method of receiving acknowledgment signals, the method comprising transmitting, to a user device, a first number of packets on a first communication link, transmitting, to the user device, a second number of packets on a second communication link, receiving an acknowledgement codeword from the user device, and determining which of the transmitted first and second number of packets were acknowledged based on the acknowledgement codeword, the first number of packets, and the second number of packets.

Another aspect is a base station comprising a transmitter configured to transmit a first number of packets via a first communication link between the base station and a user device and to transmit a second number of packets via a second communication link between the base station and the user device, a receiver configured to receive a codeword from the user device, and a processor configured to determine which of the transmitted packets were acknowledged based on the codeword, the first number, and second number.

A base station comprising means for transmitting a first number of packets via a first communication link between the base station and a user device and a second number of packets via a second communication link between the base station and the user device, means for receiving a codeword from the user device, and means for determining which of the transmitted packets were acknowledged based on the codeword, the first number, and second number.

Another aspect is a computer-readable storage medium having encoded thereon an acknowledgment codebook containing a number of codewords (C), each codeword indicative of an acknowledgment or not-acknowledgment of a number of packets ($p_1, p_2, \ldots, p_K$) transmitted on a number of carriers (K), wherein $$C < \left( \prod_{j=1}^{K} \sum_{i=0}^{p_j} 2^i \right) - 1.$$

Yet another aspect is a method of transmitting channel information, the method comprising transmitting, using a channelization code, a first channel information signal indicative of information regarding a first carrier, transmitting, using the channelization code, a second channel information signal indicative of information regarding a second carrier, and transmitting, between the transmissions of the first and second channel information signals, using the channelization code, an acknowledgment signal acknowledging packets received on the first carrier and packets received on the second carrier.

Another aspect is a user device comprising a receiver configured to receive packets over at least a first carrier and a second carrier, and a transmitter configure to transmit, using a channelization code, a first channel information signal indicative of information regarding the first carrier, a second channel information signal indicative of information regarding the second carrier, and, between the first and second channel information signals, an acknowledgment signal acknowledging receptions of the packets.

Yet another aspect is a computer-readable storage medium having instructions encoded thereon which, when executed by one or more processors, causes a computer to perform a method of transmitting channel information, the method comprising, transmitting, using a channelization code, a first channel information signal indicative of information regarding a first carrier, transmitting, using the channelization code, a second channel information signal indicative of information regarding the second carrier, and transmitting, between the transmissions of the first and second channel information signals, using the channelization code, an acknowledgment signal acknowledging packets received on the first carrier and packets received on the second carrier.

BRIEF DESCRIPTION OF THE DRAWINGS

FIG. 2 is a table of the number of codewords needed for each of the transmission possibilities over a single-packet communication link and a dual-packet communication link.

FIG. 3 is an exemplary codebook for packet acknowledgment of a single-packet communication link and a dual-packet communication link.

FIG. 5 is a table of the number of codewords needed for each of the transmission possibilities over two dual-packet communication links.

FIG. 6 is an exemplary codebook for packet acknowledgement of two dual-packet communication links.

DETAILED DESCRIPTION OF CERTAIN EMBODIMENTS

Figure 1:
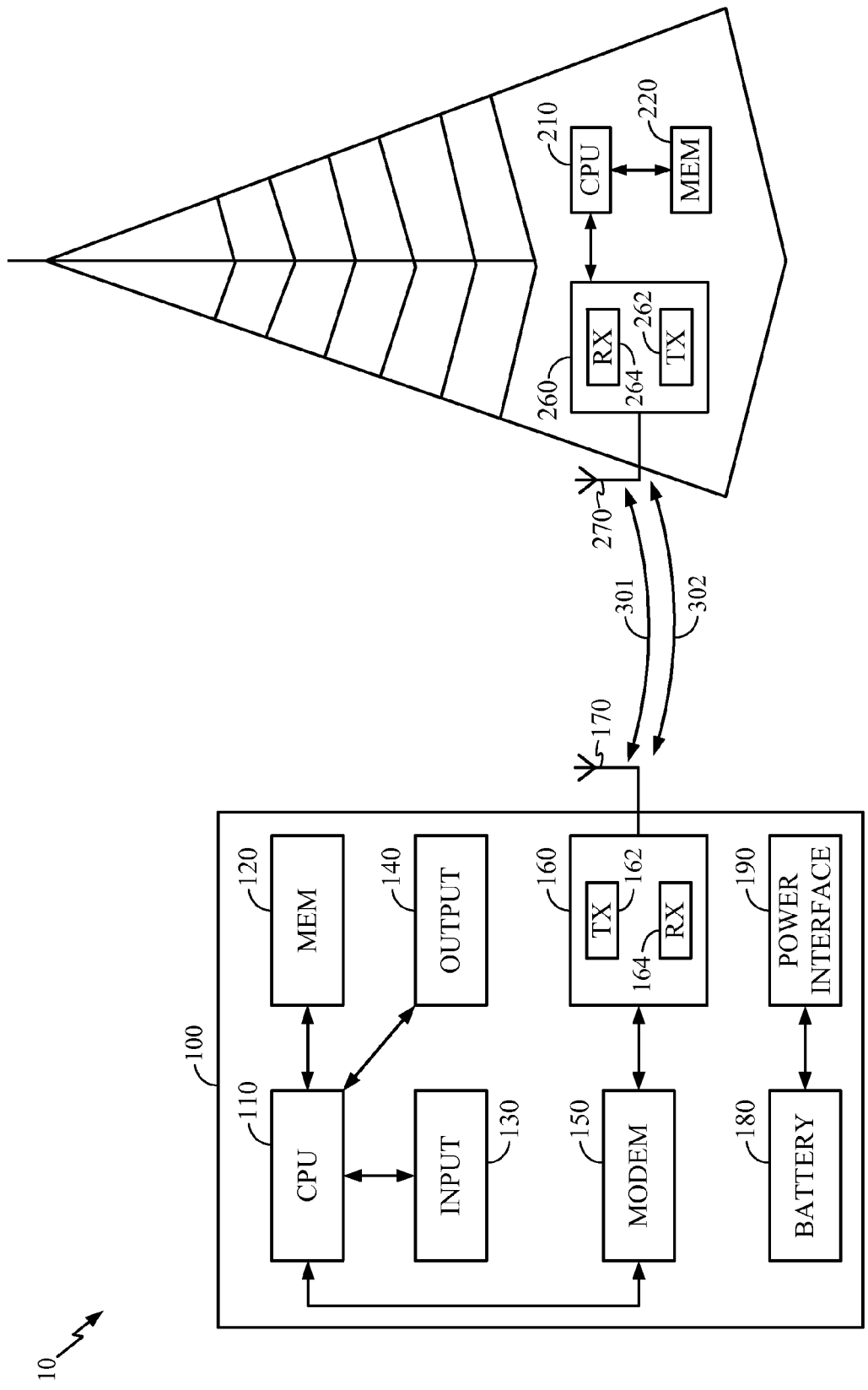
FIG. 1 is a functional block diagram of a wireless communication system.

FIG. 1 is a functional block diagram of a wireless communication system 10. The wireless communication system 10 includes at least one user equipment 100 and at least one base station 200 communicating with each other over a first communication link 301 and a second communication link 302. Each of the first and second communication links 301, 302 can be a single-packet communication link on which a single packet may be transmitted during each cycle or a multi-packet communication link on which on which multiple packets may be transmitted during each cycle. For example, the first communication link 301 can be a dual-packet communication link on which zero, one, or two packets can be transmitted during each cycle.

The user equipment 100 includes a processor 110 in data communication with a memory 120, an input device 130, and an output device 140. The processor is further in data communication with a modem 150 and a transceiver 160. The transceiver 160 is also in data communication with the modem 150 and an antenna 170. The user equipment 100 and components thereof are powered by a battery 180 and/or an external power source. In some embodiments, the battery 180, or a portion thereof, is rechargeable by an external power source via a power interface 190. Although described separately, it is to be appreciated that functional blocks described with respect to the user equipment 100 need not be separate structural elements. For example, the processor 110 and memory 120 may be embodied in a single chip. Similarly, two or more of the processor 110, modem 150, and transceiver 160 may be embodied in a single chip.

The processor 110 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 110 can be coupled, via one or more buses, to read information from or write information to the memory 120. The processor may additionally, or in the alternative, contain memory, such as processor registers. The memory 120 can include processor cache, including a multi-level hierarchical cache in which different levels have different capacities and access speeds. The memory 120 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 110 is also coupled to an input device 130 and an output device 140 for, respectively, receiving input from and providing output to, a user of the user equipment 100. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices.

The processor 110 is further coupled to a modem 150 and a transceiver 160. The modem 150 and transceiver 160 prepare data generated by the processor 110 for wireless transmission over the communication links 301, 302 via the antenna 170 according to one or more air interface standards. The modem 150 and transceiver 160 also demodulate data received over the communication links 301, 302 via the antenna 170 according to one or more air interface standards. The transceiver can include a transmitter 162, a receiver 164, or both. In other embodiments, the transmitter 162 and receiver 164 are two separate components. The modem 150 and transceiver 160, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. The antenna 170 can include multiple antennas for multiple-input/multiple-output (MIMO) communication.

The user equipment 100 and components thereof are powered by a battery 180 and/or an external power source. The battery 180 can be any device which stores energy, and particularly any device which stores chemical energy and provides it as electrical energy. The battery 180 can include one or more secondary cells including a lithium polymer battery, a lithium ion battery, a nickel-metal hydride battery, or a nickel cadmium battery, or one or more primary cells including an alkaline battery, a lithium battery, a silver oxide battery, or a zinc carbon battery. The external power source can include a wall socket, a vehicular cigar lighter receptacle, a wireless energy transfer platform, or the sun.

In some embodiments, the battery 180, or a portion thereof, is rechargeable by an external power source via a power interface 190. The power interface 190 can include a jack for connecting a battery charger, an inductor for near field wireless energy transfer, or a photovoltaic panel for converting solar energy into electrical energy.

In some embodiments, the user equipment 100 is a mobile telephone, a personal data assistant (PDAs), a hand-held computer, a laptop computer, a wireless data access card, a GPS receiver/navigator, a camera, an MP3 player, a camcorder, a game console, a wrist watch, a clock, or a television.

The base station 200 also includes at least a processor 210 coupled to a memory 220 and a transceiver 260. The transceiver 260 includes a transmitter 262 and a receiver 264 coupled to an antenna 270. The processor 210, memory 220, transceiver 260, and antenna 270 can be embodied as described above with respect to the user equipment 100.

In the wireless communication system 10 of FIG. 1, the base station 200 can transmit data packets to the user equipment 100 via a first communication link 301 and a second communication link 302. In one embodiment, the base station can transmit, via the first communication link 301, up to two packets per cycle, whereas the base station 200 can only transmit up to one packet per cycle via the second communication link 302.

Therefore, during each cycle, there are six possible transmissions. Referring now to FIG. 2, the six possible transmissions are designated Tx A-F as follows: Tx A, zero packets on either communication link; Tx B, zero packets on the first communication link and one packet on the second communication link; Tx C, one packet on the first communication link and zero packets on the second communication link; Tx D, one packet on each communication link; Tx E, two packets on the first communication link and zero packets on the second communication link; and Tx F, two packets on the first communication link and one packet on the second communication link. Likewise, there are six possible detections at the user equipment.

If the base station 200 transmits according to Tx A, the base station does not expect a response, and the user device 100, which does not detect any packets on either communication link, transmits none. Therefore, as shown in FIG. 2, no codewords are needed for Tx A.

If the base station 200 transmits according to Tx B, the base station 200 expects either an ACK or NACK of the packet transmitted on the second communication link 302. If the user device 100 does not detect the packet, it does not transmit a response believing the base station 200 has transmitted according to Tx A. If the base station 200 does not receive a response, it will determine that the packet has not been received. If the user device 100 detects the packet on the second communication link 302, it analyzes the packet and decides whether to send a codeword indicating an ACK of the packet or a NACK of the packet. Thus, two codewords are needed for Tx B.

If the base station 200 transmits according to Tx C, the base station 200 expects either an ACK or NACK of the packet transmitted on the first communication link 301. If the user device 100 does not detect the packet, it does not transmit a response believing the base station 200 has transmitted according to Tx A. If the base station 200 does not receive a response, it will determine that the packet has not been received. If the user device 100 detects the packet on the first communication link 301, it analyzes the packet and decides whether to send a codeword indicating an ACK of the packet or a NACK of the packet. Thus, two codewords are needed for Tx C. Unfortunately, the same codewords as those for Tx B cannot be used because ambiguity would result from undetected packets in transmission possibilities discussed below, e.g. Tx D.

If the base station 200 transmits according to Tx D, the base station 200 expects an ACK or NACK for the packet transmitted on the first communication 301 and an ACK or NACK for the packet transmitted on the second communication link 302. If the user device 100 detects neither of the packets, it does not transmit a response believing the base station 200 has transmitted according to Tx A. If the base station 200 does not receive a response, it will determine that neither of the packets has been received. If the user device 100 detects the packet on the first communication link 301, but does not detect the packet on the second communication link 302, it will believe that the base station 200 has transmitted according to Tx C, analyze the detected packet, and transmit one of the ACK/NACK codewords for Tx C. If the user device 100 detects the packet on the second communication link 302, but does not detect the packet on the first communication link 301, it will believe that the base station 200 has transmitted according to Tx B, analyze the detected packet, and transmit one of the ACK/NACK codewords for Tx B. Because the codewords for Tx B and Tx C are different, the base station 200 can determine which packet was not detected. If the codewords were the same, the base station 200 would be unable to tell which of the packets was not detected. If the user device 100 detects both packets, it analyzes the packets and decides whether to send a codeword indicating an ACK for both packets, an ACK for the first packet and a NACK for the second packet, a NACK for the first packet and an ACK for the second packet, or a NACK for both packets. Thus, four codewords are needed for Tx D.

If the base station 200 transmits according to Tx E, the base station 200 expects a codeword indicating an ACK for both packets, an ACK for the first packet and a NACK for the second packet, a NACK for the first packet and an ACK for the second packet, or a NACK for both packets. If the user device 100 does not detect the packets, it does not transmit a response believing the base station 200 has transmitted according to Tx A. If the base station 200 does not receive a response, it will determine that the packets have not been received. If the user device 100 detects the packets, it analyzes the packets and decides whether to send a codeword indicating an ACK for both packets, an ACK for the first packet and a NACK for the second packet, a NACK for the first packet and an ACK for the second packet, or a NACK for both packets. Thus, four codewords are needed for Tx E. However, no ambiguity arises if these codewords are the same as those selected for Tx D. Upon receiving one of these codewords, the base station 200 can determine the result based on the packets it transmitted.

Finally, if the base station 200 transmits according to Tx F, the base station 200 expects a codeword indicating an ACK or NACK for each of the three packets. If the user device 100 does not detect any of the packets, it does not transmit a response believing the base station 200 has transmitted according to Tx A. If the base station 200 does not receive a response, it will determine that none of the packets have been received. If the user device detects the packets on the first communication link 301, but does not detect the packet on the second communication link 302, it will believe that the base station 200 has transmitted according to Tx E, analyze the detected packet, and transmit one of the ACK/NACK codewords for Tx E. If the user device 100 detects the packet on the second communication link 302, but does not detect the packets on the first communication link 301, it will believe the base station 200 has transmitted according to Tx B, analyze the detected packet, and transmit one of the ACK/NACK codewords for Tx B. If the user device 100 detects the packets on both communication links, it analyzes the packets and decides whether to send a codeword indicating an indicating an ACK or NACK for each of the three packets. Thus, eight (2×2×2) codewords are needed for Tx F.

Because the four codewords for Tx D and the four codewords for Tx E can be the same without introducing any ambiguity, only sixteen codewords are needed for the codebook. Thus, the number of bits required to represent all possible codewords is reduced from 5 bits (to represent 20 codewords) to 4 bits (to represent 16 codewords).

FIG. 3 illustrates an exemplary codebook containing the codewords. As described above, if the base station 200 does not receive an ACK/NACK response from the user equipment 100, it determines that none of the packets have been received.

The base station 200 may receive codeword 1 or codeword 2 in response to a transmission according to Tx B, Tx D, or Tx F. If the base station receives codeword 1 or codeword 2 in response to a transmission according to Tx D or Tx F, it will determine that the packets transmitted on the first communication link 301 have not been received.

The base station 200 may receive codeword 3 or codeword 4 in response to a transmission according to Tx C or Tx D. If the base station 200 receives codeword 3 or codeword 4 in response to a transmission according to Tx D, it will determine that the packets transmitted on the second communication link 302 have not been received.

The base station 200 may receive one of codewords 5, 6, 7, or 8 in response to a transmission according to Tx D, Tx E, or Tx F. If the base station 200 receives one of codewords 5, 6, 7, or 8 in response to a transmission according to Tx D, it will determine that the packet transmitted on the first communication link 301 has been detected and the packet transmitted on the second communication link 302 has been detected. If the base station receives codeword 5 or codeword 6, it will determine that the packet on the first communication link 301 has been acknowledged and if the base station receives codeword 5 or codeword 7, it will determine that the packet on the second communication link 302 has been acknowledged.

If the base station 200 receives one of codewords 5, 6, 7, or 8 in response to a transmission according to Tx E, it will determined that both packets transmitted on the first communication link 301 have been detected. If the base station receives codeword 5 or codeword 6, it will determine that the first packet transmitted on the first communication link 301 has been acknowledged and if the base station receives codeword 5 or codeword 7, it will determine that the second packet transmitted on the first communication link 301 has been acknowledged.

If the base station 200 receives one of codewords 5, 6, 7, or 8 in response to a transmission according to Tx F, it will determine that both packets transmitted on the first communication link 301 have been detected and the packet transmitted on the second communication link 302 has not been detected. If the base station receives codeword 5 or codeword 6, it will determine that the first packet transmitted on the first communication link 301 has been acknowledged and if the base station receives codeword 5 or codeword 7, it will determine that the second packet transmitted on the first communication link 301 has been acknowledged.

The base station 200 may receive one of codewords 9-16 in response to a transmission according to Tx F. If the base station 200 receives one of codewords 9-16, it will determine that all transmitted packets have been detected and will determined which packets were acknowledged based on the codeword.

Figure 4:
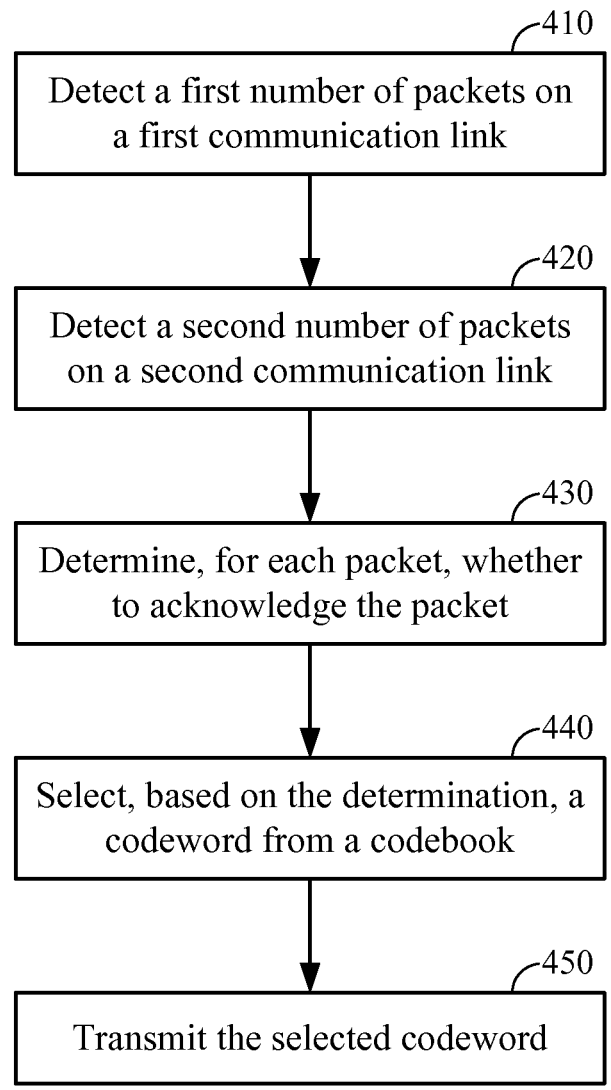
FIG. 4 is a flowchart illustrating a method of selecting a codeword.

FIG. 4 is a flowchart illustrating a method of selecting a codeword which can, for example, be performed by the user equipment 100 of FIG. 1. The process 400 begins, in block 410, with the detection of a first number of packets on a first communication link. The detection can be performed, for example, by one or more of the processor 100, transceiver 160, or antenna 170. The first communication link can be, for example, the first communication link 301 of FIG. 1 between the user equipment 100 and the base station 200. The detected number of packets can be, for example, zero packets, one packet, or multiple packets. The packets can be detected, for example, by comparing a received signal power over the first communication link to a predetermined threshold. The number of detected packets may depend on an expected number of packets. For example, if the received signal power is greater than a predetermined threshold over a single-packet link, it may be determined that one packet is detected, whereas if the received signal power is greater than a predetermined threshold over a dual-packet link, it may be determined that two packets are detected.

Next, in block 420, a second number of packets are detected on a second communication link. The detection can be performed, for example, by one or more of the processor 100, transceiver 160, or antenna 170. The second communication link can be, for example, the second communication link 302 of FIG. 2 between the user equipment 100 and the base station 200. The detected number of packets can be, for example, zero packets, one packet, or multiple packets. The packets can be detected, for example, by comparing a received signal power over the second communication link to a predetermined threshold. The number of detected packets may depend on an expected number of packets. For example, if the received signal power is greater than a predetermined threshold over a single-packet link, it may be determined that one packet is detected, whereas if the received signal power is greater than a predetermined threshold over a dual-packet link, it may be determined that two packets are detected.

Although blocks 410 and 420 are described sequentially, it will be appreciated that they steps described with respect to block 410 and 420 can be performed simultaneously, overlapping in time, or in reverse order.

Continuing to block 430, for each packet, it is determined whether to acknowledge (ACK) or not-acknowledge (NACK) each packet. The determination can be performed, for example, by the processor 110. In one embodiment, the determination of whether to acknowledge a packet is based on a cyclic redundancy check (CRC) performed upon the packet. For example, if a packet passes the CRC, then it is determined to acknowledge the packet.

In block 440, a codeword is selected based on the acknowledgement determinations. The selection can be performed, for example, by the processor 110 in conjunction with the memory 120. In some embodiments, including the exemplary codebook of FIG. 3, the codebook includes a set of codewords for acknowledging or not-acknowledging each of the first number of packets on the first communication link and each of the second number of packets on the second communication link, wherein the same set of codewords is also used for acknowledging or not-acknowledging each of third number of packets on the first communication link and fourth number of packets on the second communication, the third number being different from the first number, the fourth number being different from the second number, and the sum of the first and second numbers being the same as the sum of the third and the fourth numbers. For example, the codebook of FIG. 3 includes a set of codewords (codewords 5, 6, 7, and 8) for acknowledging or not-acknowledging one packet on the first communication link and one packet on the second communication link. The same set of codewords (codewords 5, 6, 7, and 8) are also for acknowledging or not-acknowledging two packets on the first communication link and zero packets on the second communication link. In this case, the third number (2) is different from the first number (1), the fourth number (0) is different from the second number (1), and the sum of the third and fourth number (2+0=2) is the same as the sum of the first and second number (1+1=2). In another embodiment, the first number is two, the second number is one, the third number is one, and the fourth number is two.

Finally, in block 450, the selected codeword is transmitted. This can be performed, for example, by at least one of the processor 110, modem 150, transceiver 160, or antenna 170. The selected codeword can be transmitted via the first communication link, the second communication link, or over a different communication link.

For simplicity, the discussion above has focused on communication over an embodiment in which the base station 200 can transmit, via the first communication link 301, up to two packets per cycle, whereas the base station 200 can only transmit up to one packet per cycle via the second communication link 302. In another embodiment, the base station 200 can transmit up to two packets per cycle via the first communication link 301 and up to two packets per cycle via the second communication link 302.

Therefore, during each cycle, there are nine possible transmissions. Referring now to FIG. 5, these nine possible transmissions are designated Tx G-O. Likewise, there are nine possible detections at the user equipment 100. By the same reasoning as above with respect to FIG. 2, zero codewords are required for Tx G, two codewords are required for Tx H, four codewords are required for Tx I, two codewords are required for Tx J, four codewords are required for Tx K, eight codewords are required for Tx L, four codewords are required for Tx M, eight codewords are required for Tx N, and sixteen codewords are required for Tx O.

As noted above with respect to FIG. 2, ambiguity would arise if the codewords for Tx B and Tx C were the same, due to the fact that Tx D can be misinterpreted by the user equipment 100 as Tx B or Tx C. As further noted above, no ambiguity arises if the codewords for Tx D and Tx E are the same.

With respect to FIG. 5, ambiguity would arise if the codewords for Tx M and Tx I were the same, due to the fact the Tx O can be misinterpreted by the user equipment 100 as Tx M or Tx I. However, no ambiguity arises if the codewords for Tx K are the same as those for Tx M or Tx I. Thus, at least four codewords can be reused. Further, no ambiguity would arise if the codewords for Tx L and Tx N were the same. Thus, another eight codewords can be reused. Even further, the codewords for Tx L and Tx N can be subset of those used for Tx O without any ambiguity. Therefore, another eight codewords can be reused.

Because, without introducing any ambiguity, the four codewords for Tx K and the four codewords for Tx M can be the same and the eight codewords for Tx M and the eight codewords for Tx N can be the same and a subset of the sixteen used for the Tx O, only 28 codewords are needed for the codebook. Thus, the number of bits required to represent all possible codewords is reduced from 6 bits (to represent 48 codewords) to 5 bits (to represent 28 codewords).

FIG. 6 illustrates an exemplary codebook containing the codewords. As illustrated above, the number of codewords in a codebook can be reduced by reusing the same codewords to indicate different receptions without introducing ambiguity. By reducing the number of codewords, less bits are required to transmit the information. Also, by reducing the number of codewords, the codewords can be spaced further apart in Euclidian space in order to minimize the probability of improperly detecting the codeword.

Figure 7:
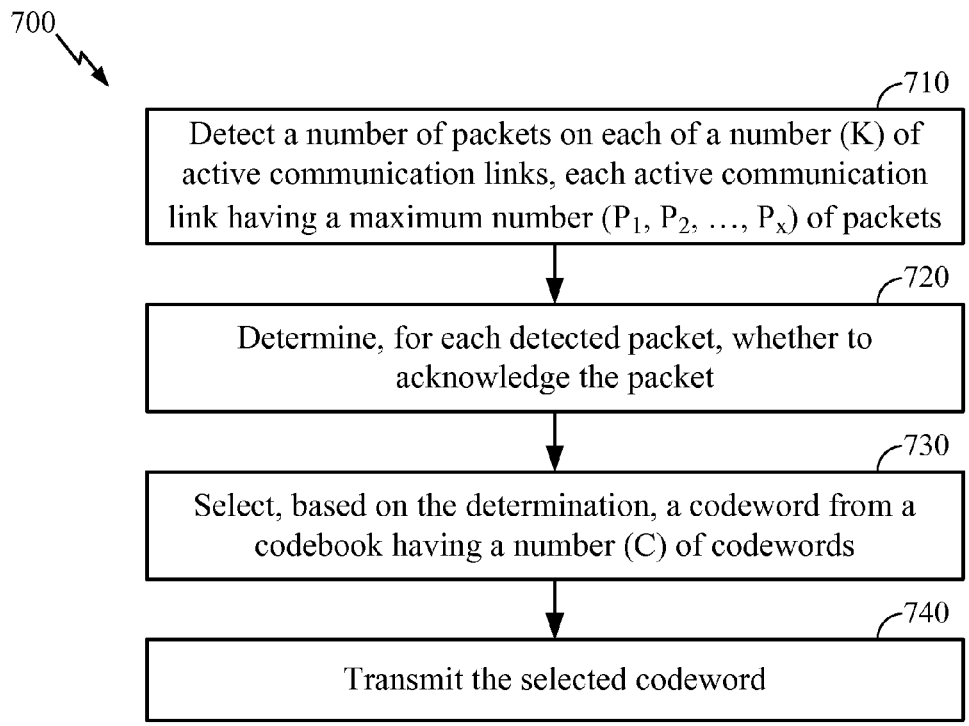
FIG. 7 is a flowchart illustrating another method of selecting a codeword.

FIG. 7 illustrates another method of selecting a codeword which can, for example, be performed by the user equipment 100 of FIG. 1. The process 700 begins, in block 710, with the detection of a number of packets on each of a number (K) of active communication links. The detection can be performed, for example, by one or more of the processor 100, transceiver 160, or antenna 170 in the manner describe above with respect to block 410 of FIG. 4. In the embodiment illustrated in FIG. 1, the number of active communication link (K) is two. However, in other embodiments, there may be two, three, four, or more active communication links. As discussed above, each communication link may be a single-packet communication link, a dual-packet communication link, or a link over which more than two packets per cycle can be transmitted. Thus, each communication link is associated with a maximum number ($p_1$, $p_2$, ..., $p_K$) of packets which can be transmitted during each cycle over the communication link. For example, in a single-packet communication link, the maximum number of packets ($p_j$) is one, whereas for a dual-packet communication link, the maximum number of packets ($p_j$) is two. The number of detected packets for each communication link is necessarily less than or equal to the maximum number of packets associated with that communication link.

Next, in block 720, for each packet, it is determined whether to acknowledge (ACK) or not-acknowledge (NACK) each packet. The determination can be performed, for example, by the processor 110. In one embodiment, the determination of whether to acknowledge a packet is based on a cyclic redundancy check (CRC) performed upon the packet. For example, if a packet passes the CRC, then it is determined to acknowledge the packet.

In block 730, a codeword is selected based on the acknowledgement determinations. The selection can be performed, for example, by the processor 110 in conjunction with the memory 120. In some embodiments, including the exemplary codebooks of FIG. 3 and FIG. 6, the codebook includes a total number (C) of codewords, wherein the following expression is true:

$$C < \left( \prod_{j=1}^{K} \sum_{i=0}^{p_j} 2^i \right) - 1 \qquad (1)$$

For example, in FIG. 2, the total number of codewords without redundancy is 20, which is $$\left( \prod_{j=1}^{K} \sum_{i=0}^{p_j} 2^i \right) - 1$$

for K=2, $p_1$=2, and $p_2$=1, i.e. (1+2+4)(1+2)−1=20. However, the codebook illustrated in FIG. 3 has a total number (C) of codewords equal to 16, which less than $$\left( \prod_{j=1}^{K} \sum_{i=0}^{p_j} 2^i \right) - 1.$$

In particular, the number (C) of codewords is $$2^{(\Sigma_{k=1}^{K} p_k)-1} = 4$$

less. As another example, in FIG. 5, the total number of codewords without exploiting redundancy is 48, which is $$\left( \prod_{j=1}^{K} \sum_{i=0}^{p_j} 2^i \right) - 1$$

for K=2, $p_1$=2, and $p_2$=2, i.e. (1+2+4)(1+2+4)−1=48. However, the codebook illustrated in FIG. 6 has a total number (C) of codewords equal to 28, which is less than $$\left( \prod_{j=1}^{K} \sum_{i=0}^{p_j} 2^i \right) - 1.$$

As another example, the total number of codewords without redundancy for four communication links, in which two of the links are single-packet communication links and two of the packets are dual-packet communication links, is 440, which is $$\left(\prod_{j=1}^{K} \sum_{i=0}^{p_j} 2^i\right) - 1$$

for K=4, $p_1$=1, $p_2$=1, $p_3$=2, and $p_4$=2, i.e. (1+2)(1+2)(1+2+4)(1+2+4)−1=440. In yet another example, the total number of codewords without redundancy for four dual-packet communication links is 2400, which is $$\left(\prod_{j=1}^{K} \sum_{i=0}^{p_j} 2^i\right) - 1$$

for K=4, $p_1$=2, $p_2$=2, $p_3$=2, and $p_4$=2, i.e. (1+2+4)(1+2+4)(1+2+4)(1+2+4)−1=2400. In the later case, by transmitting the same codewords whenever seven packets are transmitted, only 2016 codewords are used.

Finally, in block 740, the selected codeword is transmitted. This can be performed, for example, by at least one of the processor 110, modem 150, transceiver 160, or antenna 170. The selected codeword can be transmitted via one of the active communication links or over a different communication link.

Figure 8:
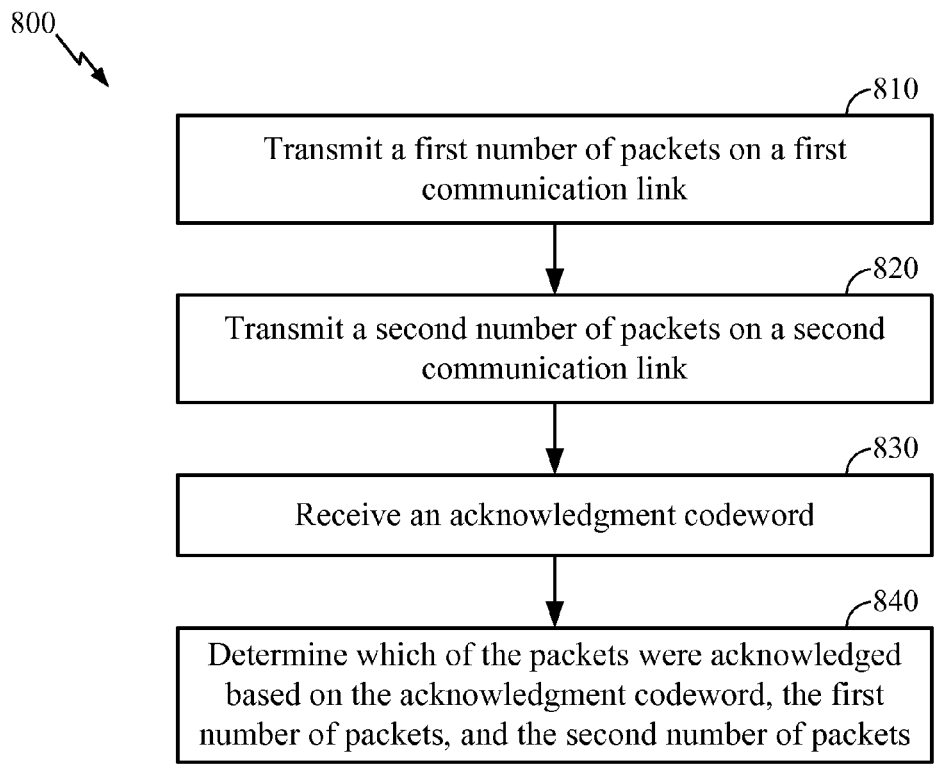
FIG. 8 is a flowchart illustrating a method of receiving a codeword.

FIGS. 4 and 7 discussed above were flowcharts illustrating methods of selecting a codeword which could be performed, for example, by the user equipment 100 of FIG. 1. FIG. 8 is a flowchart illustrating a method of receiving a codeword which could be performed, for example, by the base station 200 of FIG. 1.

The process 800, begins, in block 810, with the transmission of a first number of packets on a first communication link. The transmission can be performed, for example, by one or more of the processor 210, transceiver 260, or antenna 270. The first communication link can be, for example, the first communication link 301 of FIG. 1 between the user equipment 100 and the base station 200. The transmitted number of packets can be, for example, zero packets, one packet, or multiple packets.

The process 800 continues, in block 820, with the transmission of a second number of packets on a second communication link. The transmission can also be performed, for example, by one or more of the processor 210, transceiver 260, or antenna 270. The second communication link can be, for example, the second communication link 302 of FIG. 1 between the user equipment 100 and the base station 200. The transmitted number of packets can be, for example, zero packets, one packet, or multiple packets.

Although blocks 810 and 820 are described sequentially, it will be appreciated that the steps described with respect to block 810 and 820 can be performed simultaneously, overlapping in time, or in reverse order. Further, although only two communications links are described in the embodiment illustrated in FIG. 8, it is to be appreciated that the same process can be applied to more than two communication links.

In block 830 an acknowledgment codeword is received. The reception can be performed, for example, by one or more of the antenna 270, transceiver 260, or processor 210. In response, the process 800 continues to block 840 where it is determined which of the packets were acknowledged based on the codeword, the first number of packets, and the second number of packets. Because the codeword used can be indicative of a number of different receptions, the first number of packets and the second number of packets are used to remove any ambiguity. For example, if codeword 19 of FIG. 6 is received, knowing the number first number of packets is two and the second number of packets is one allows the base station 200 to determine that the two packets on the first communication link have not been acknowledged, whereas the one packet on the second communication link has been acknowledged. In one embodiment, in response to the determination, the base station 200 retransmits the undetected or not-acknowledged packets.

Figure 18:
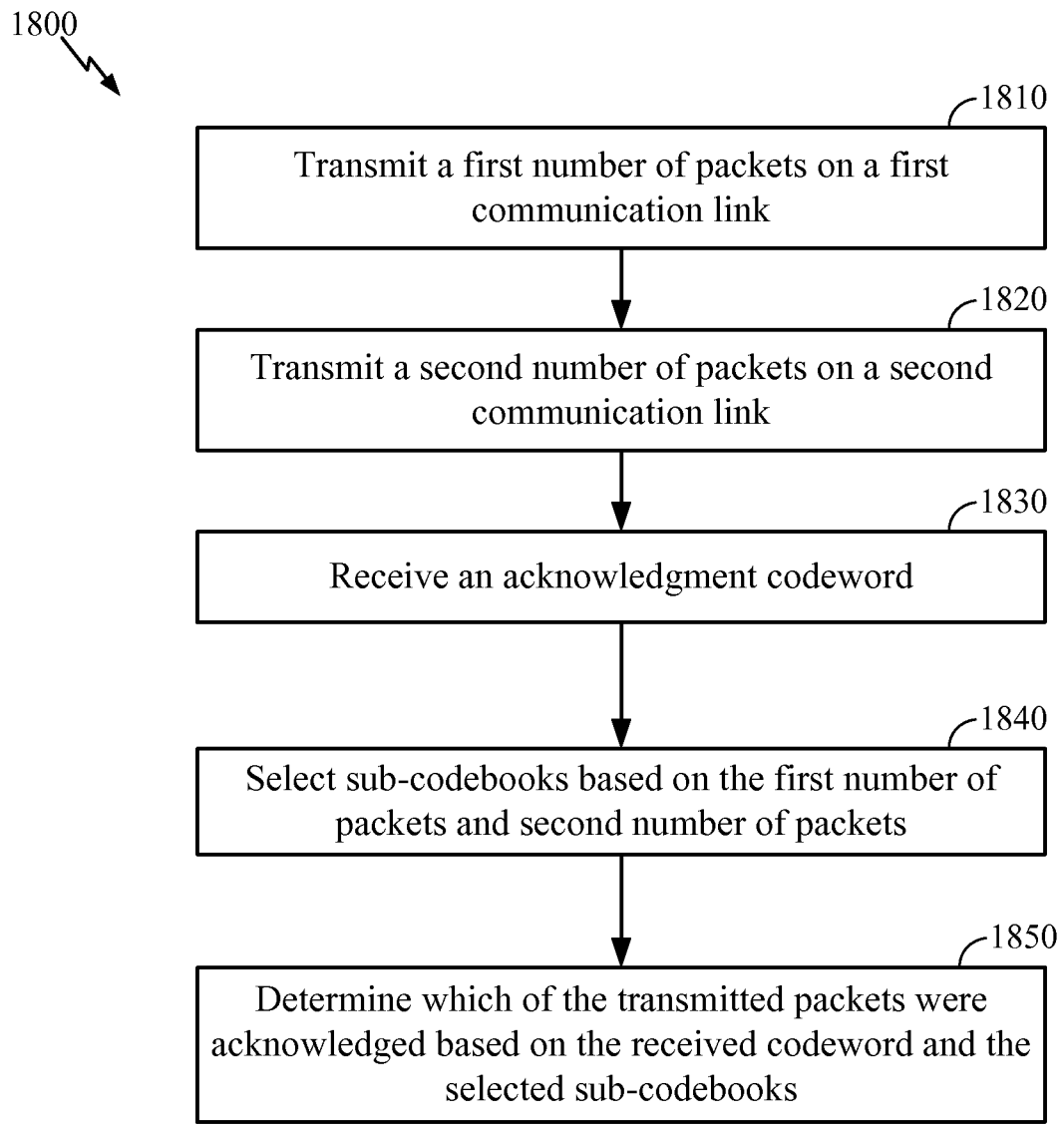
FIG. 18 is a flowchart illustrating another method of receiving a codeword.

FIG. 18 is a flowchart illustrating another method of receiving a codeword and determining which of transmitted packets were received, detected, and/or acknowledged based on the received codeword. The process 1800, begins, in block 1810, with the transmission of a first number of packets on a first communication link. The transmission can be performed, for example, by one or more of the processor 210, transceiver 260, or antenna 270. The first communication link can be, for example, the first communication link 301 of FIG. 1 between the user equipment 100 and the base station 200. The transmitted number of packets can be, for example, zero packets, one packet, or multiple packets.

The process 1800 continues, in block 1820, with the transmission of a second number of packets on a second communication link. The transmission can also be performed, for example, by one or more of the processor 210, transceiver 260, or antenna 270. The second communication link can be, for example, the second communication link 302 of FIG. 1 between the user equipment 100 and the base station 200. The transmitted number of packets can be, for example, zero packets, one packet, or multiple packets.

Although blocks 1810 and 1820 are described sequentially, it will be appreciated that the steps described with respect to block 1810 and 1820 can be performed simultaneously, overlapping in time, or in reverse order. Further, although only two communications links are described in the embodiment illustrated in FIG. 18, it is to be appreciated that the same process can be applied to more than two communication links, such as four communication links or more than four communication links.

In block 1830, an acknowledgment codeword is received. The reception can be performed, for example, by one or more of the antenna 270, transceiver 260, or processor 210.

FIG. 5 illustrates a number of transmission possibilities and the number of codewords required for each transmission possibility. Each of these transmission possibilities can be associated with a sub-codebook containing the listed number of codewords. However, some of the codewords in the different sub-codebooks may be the same. In block 1840, a number of sub-codebooks are selected based on the first number of packets and second number of packets. Although described after block 1830, the step described below could be performed before the reception of an acknowledgment codeword.

As mentioned above, if the base station 200 transmits according to Tx O, the user equipment 100 can misinterpreted this as Tx M, Tx I, and Tx G. Thus, the base station would select the sub-codebooks for Tx O, Tx M, Tx I, and Tx G. The other transmission possibilities would not be selected and not searched in the following step to save processing time and power. As another example, if the base station 200 transmits according to Tx N, the base station would select the sub-codebooks for Tx N, Tx M, Tx H, and Tx G. The selected sub-codebooks belong to a sub-codebook group, the codewords of which may be selected to maximize the Euclidean distance between the unique codewords of the group.

Finally, in block 1850, it is determined which of the packets were acknowledged based on the codeword and the selected sub-codebooks. The selected sub-codebooks can be analyzed sequentially or concurrently to determine which packets were acknowledged.

The aspects and embodiments disclosed above can be employed in a wireless communication system using Multi-Carrier HSPA (High Speed Packet Access). HSDPA (High Speed Downlink Packet Access) allows dual cell operation on adjacent carriers. It has been proposed to allow for three or four HSDPA carriers to be aggregated as well as to allow for combining MIMO operation in up to two carriers. Discussed in detail below is a HS-DPCCH (High Speed-Dedicated Physical Control Channel) framework to support the different combinations of features proposed in multi-carrier HSDPA. The HS-DPCCH carries acknowledgment information and current channel quality indicator (CQI) of the user.

Before detailing HS-DPCCH design options below, herein are discussed different combinations of MC-HSDPA features. In one embodiment, multi-carrier transmission only applies to HSDPA physical channels, the carriers belong to the same Node-B and when on the same band are on adjacent carriers, MIMO can be combined with up to two HSDPA carriers in up to two separate frequency bands, the carriers operate in up to two separate frequency bands, and up to four HSDPA carriers can be aggregated.

Thus, a MC-HSDPA UE should be capable of simultaneously communicating over zero, one, two, three, or four carriers. In the case of intra-band carrier aggregation, the UE can assume the carriers are adjacent. Accordingly, the following configurations are possible when multiple HSDPA are aggregated: (A) one carrier in a single band, (B) two adjacent carriers in a single band, (C) three adjacent carriers in a single band, (D) four adjacent carriers in a single band, (E) one carrier in a first band and one carrier in a second band, (F) two adjacent carriers in a first band and one carrier in a second band, (G) two adjacent carrier in a first band and two adjacent carriers in a second band, or (H) three adjacent carriers in a first band and one carrier in a second band. In each of the above cases, the UE can demodulate and decode MIMO transmissions in up to two carriers.

In one embodiment, a single channelization coding scheme can be used for HS-DPCCH. For example, in one particular embodiment, the ACK/NACK/DTX information for two carriers is jointly encoded using one out of ten codewords and is sent in a single time slot. Further, the CQI for the two carriers is jointly encoded. In another embodiment, a dual channelization coding scheme can be used.

Various design objectives can be considered for various HS-DPCCH embodiments for MC-HSDPA. In one embodiment, it is desirable to carry the same amount of feedback information per cell. Thus, in one embodiment, the same number of information bits for ACK/NACK and CQI are used in each cell. In another embodiment, it is desirable to ensure that there is no significant impact to the link budget. Thus, in one embodiment, single channelization code designs are preferred. In another embodiment, it is desirable to reuse existing codes. Thus, in one embodiment, the channel coding design and spreading and modulation code for HS-DPCCH are reused. In another embodiment, it is desirable to achieve the same performance for each cell during dual cell operation as is achieved during single cell operation. Thus, in one embodiment, after normalization of signal energy to noise ratio per cell, it is desirable to achieve the same performance on each cell when compared to the single cell operation. In another embodiment, it is desirable to avoid significant impact to uplink noise rise, interference margin, cubic metric (CM), or peak to average power (PAPR) ratios. In another embodiment, it is desirable to ensure forward compatibility. Thus, in one embodiment, the design allows for MIMO and four carrier aggregation to occur simultaneously.

An embodiment of HS-DPCCH design for the case when dual cell operation is enabled and MIMO is configured in each cell is described below. Both single and dual channelization code designs are discussed for the ACK/NACK and CQI channels.

Figure 9:
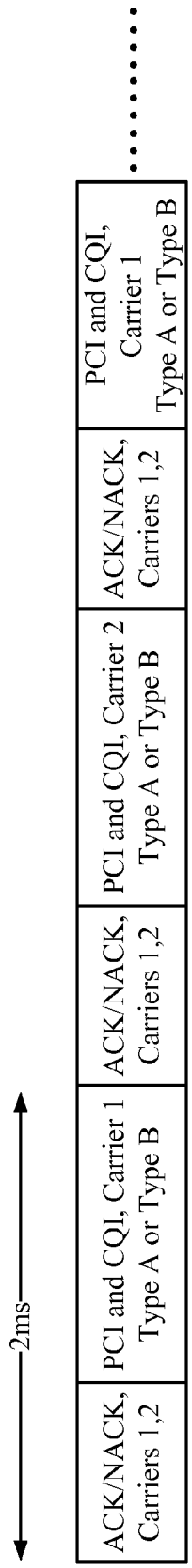
FIG. 9 is a timing diagram of a single channelization code encoding information for two carriers.

In the case of a single channelization code, the HS-DPCCH can be designed as shown in FIG. 9. For the ACK/NACK part, a joint coding scheme supports ACK/NACK feedback of up to two MIMO streams in each of the two carriers. For example, the exemplary codebook of FIG. 6 could be used. The PCI (precoding control information) and CQI (channel quality indicator) feedback information for each carrier can be time division multiplexed (CQI of Carrier 2 is offset in time with respect to CQI of Carrier 1) by setting the minimum value of the CQI Feedback cycle to 2 TTI (Transmit Time Interval) or 4 ms. Under this constraint, there is no need to design any new channel coding scheme for the PCI/CQI feedback information when using a single channelization code. Instead, in one embodiment, the following channel coding schemes for HS-DPCCH channel coding of PCI/CQI for MIMO are reused: (20,10) channel coding for Type A reports and (20,7) channel coding for Type B reports.

Figure 10:
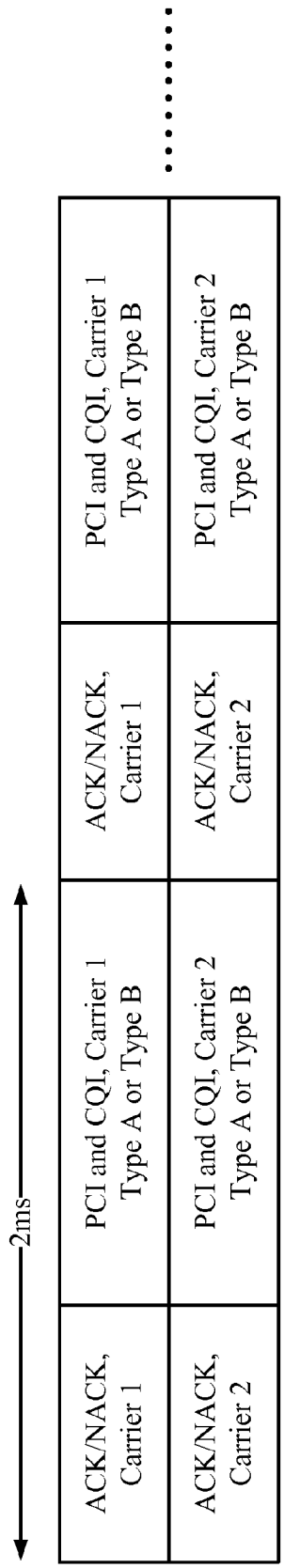
FIG. 10 is a timing diagram of a dual channelization code encoding information for two carriers.

In the case of dual channelization codes, the HS-DPCCH can be designed as shown in FIG. 10. The ACK/NACK, PCI and CQI feedback information for each of the carriers can be sent in parallel on a separate channelization code. Hence, when using dual channelization codes, in one embodiment, the following HS-DPCCH channel coding schemes are reused: Release 7 HS-DPCCH channel coding of H-ARQ ACK/NACK for MIMO, Release 7 HS-DPCCH channel coding of PCI/CQI for MIMO, (20,10) channel coding for Type A reports, and (20,7) channel coding for Type B reports.

Described below is an ACK/NACK design using a single channelization code, when MIMO and DC-HSDPA are configured simultaneously. If one were to blindly list all the possible H-ARQ ACK/NACK hypotheses corresponding to all combinations of MIMO and DC-HSDPA scheduling events, then there are a total of 48 hypotheses, as listed in FIG. 6, or 50 including PRE/POST. However, as explained above, this does not mean that 50 distinct codewords need be defined in this case, since we can identify different sets of hypotheses that are mutually exclusive to each other. In particular, there are four sets of hypotheses that can be categorized under the following events: Group A, NodeB schedules one transport block on the serving HS-DSCH cell and one transport block on the secondary serving HS-DSCH cell; Group B, NodeB schedules one transport block on the serving HS-DSCH cell and two transport blocks on the secondary serving HS-DSCH cell; Group C, NodeB schedules two transport blocks on the serving HS-DSCH cell and one transport block on the secondary serving HS-DSCH cell; and Group D, NodeB schedules two transport blocks on the serving HS-DSCH cell and two transport blocks on the secondary serving HS-DSCH cell In Group A, the NodeB schedules two transport blocks on the serving HS-DSCH cell and one transport block on the secondary serving HS-DSCH cell. This case corresponds to the DC-HSDPA Release 8 scenario when MIMO is not configured in either carrier. Including PRE/POST, there are ten possible combination H-ARQ responses from the UE whenever such an event happens at the NodeB. The hypotheses allow for the possibility that the UE missed decoding HS-SCCH on either of the carriers. Thus, in one embodiment, the ten codewords that have already been specified in Release 8 for DC-HSDPA are used whenever this combination of scheduling happens at the NodeB.

In Group B, the NodeB schedules one transport block on the serving HS-DSCH cell and two transport blocks on the secondary serving HS-DSCH cell. Whenever this combination of scheduling happens at the NodeB, including PRE/POST, there are sixteen possible H-ARQ responses from the UE. Hence, sixteen codewords would need to be defined in this case. Potentially eight of these codewords can be reused from already specified code books or codewords belonging to the other three groups. In particular, PRE and POST codewords may be the same as those specified for Group A. When the UE only detects only one transport block on the serving HS-DSCH cell, the codewords corresponding to ACK/NACK can be the same as those specified for Group A. When the UE detects only two transport blocks on the secondary serving HS-DSCH cell, the four possible combinations of ACK/NACK codewords can be the same as what is specified in Release 7 for MIMO. This will allow for reuse of single carrier MIMO decoders when only MIMO transmissions are scheduled in the secondary serving HS-DSCH cell and nothing is scheduled on the serving HS-DSCH cell. The remaining eight codewords corresponding to combinations of ACK/NACK on one transport block from the serving HS-DSCH cell and two transport blocks from the secondary serving HS-DSCH cell can be determined. When searching for the eight new codewords, one may relax or compromise the desirability to reuse the four legacy MIMO Release 7 codewords in case the minimum distance of the overall code is can be further reduced.

In Group C, the NodeB schedules two transport blocks on the serving HS-DSCH cell and one transport block on the secondary serving HS-DSCH cell. Whenever this combination of scheduling happens at the NodeB, sixteen possible H-ARQ responses can be expected from the UE. Hence sixteen new codewords would need to be defined in this case. In one embodiment, the sixteen codewords defined for Group B are partially reused. The PRE and POST code can be the same as those specified for Group A. The two codewords corresponding to ACK/NACK on the secondary serving HS-DSCH cell can be the same as those specified for Group A. The four codewords corresponding to the case when the UE detects only two transport blocks on the serving HS-DSCH cell can be the same as in Group D, but different than the four codewords used when the UE detects two blocks on the secondary serving HS-DSCH.

In Group D, the NodeB schedules two transport blocks on the serving HS-DSCH cell and two transport blocks on the secondary serving HS-DSCH cell. Whenever this combination of scheduling happens at the NodeB, 26 possible H-ARQ responses can be expected from the UE. Ten of the codewords can be those specified in other groups. In one embodiment, the PRE and POST codewords are common to all other groups (A,B, and C). In one embodiment, four of these codewords belong to Group C. These are the ACK/NACK combinations when UE only detects two transport blocks on the serving HS-DSCH cell. In one embodiment, four of these codewords belong to Group B. These are the ACK/NACK combinations when UE only detects two transport blocks on the secondary serving HS-DSCH cell. Hence, sixteen additional codewords can be specified to define a (10,5) code.

In one embodiment, a dual channelization code is used for H-ARQ ACK/NACK. The In one embodiment, on each channelization code, the existing H-ARQ ACK/NACK channel codes defined in Release 7 for MIMO are reused.

An embodiment of HS-DPCCH design for the case for four carriers when MIMO is not configured in any carrier is described below. Design options for the case when three or four carriers are aggregated and MIMO is not configured in any carrier are discussed. Both single and dual channelization code designs are discussed for the ACK/NACK and CQI channels.

Figure 11:
FIG. 11 is a timing diagram of a single channelization code encoding information for three carriers.
Figure 12:
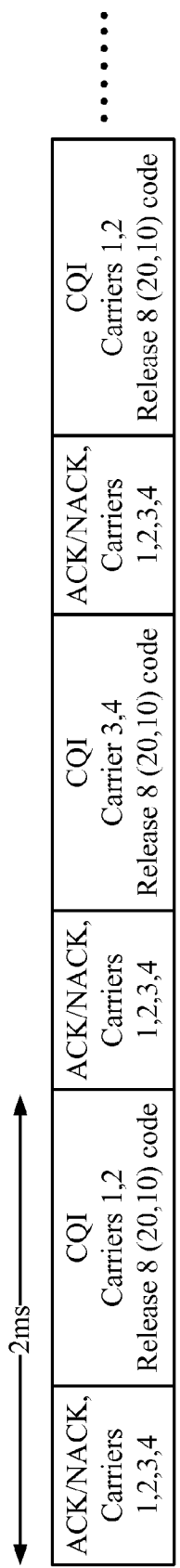
FIG. 12 is a timing diagram of a single channelization code encoding information for four carriers.

In the case of a single channelization code, the HS-DPCCH for three and four carriers (with MIMO not configured in any carrier) can be designed as shown in FIGS. 11 and 12, respectively.

For the ACK/NACK part, a new joint coding scheme can be designed to support ACK/NACK feedback for the three or four simultaneous transmissions on the downlink. Due to the fact that there is a finite probability that the UE can miss HS-SCCH on any of the carriers, the number of possible H-ARQ ACK/NACK responses from the UE increases significantly. Including PRE/POST, there are 28 possible H-ARQ ACK/NACK responses on the HS-DPCCH for the three carrier case. In other words, for K=3, $p_1=1$, $p_2=1$, and $p_3=1$, $$\left(\prod_{j=1}^{K}\sum_{i=0}^{p_j}2^i\right)-1=(1+2)(1+2)(1+2)-1=26.$$

Including the PRE and POST keywords yields 28 possible responses. Similarly, there are 82 possible H-ARQ ACK/NACK responses on the HS-DPCCH for the four carrier case. In other words, for K=4, $p_1=1$, $p_2=1$, $p_3=1$, and $p_4=1$, $(1+2)(1+2)(1+2)(1+2)-1=80$. Including the PRE and POST keywords yields 82 possible responses.

Accordingly, new codebooks of size 28 ((10, 5) code) and 82 ((10, 7)) can be defined for the three carrier and four carrier cases, respectively. In one embodiment, the (10, 5) code could be the same one as designed for Group D for the DC–HSDPA+MIMO case described above. For either of the cases when three or four carriers are configured but MIMO is not configured in any carrier, the CQI feedback information for each carrier can be time division multiplexed (CQI of Carrier 2 is offset in time with respect to CQI of Carrier 1) by setting the minimum value of the CQI Feedback cycle to 2 TTI or 4 ms. Under this constraint, there is no need to design any new channel coding scheme for the CQI feedback information when using a single channelization code. Instead, in one embodiment, channel coding schemes from previous releases are reused. For example, for three-carrier aggregation, DC-HSDPA Release 8 joint (20,10) channel coding of CQI information could be used for Carriers 1 and 2 and Release 5 (20,5) channel coding of CQI information could be used for Carrier 3. For four-carrier aggregation, DC-HSDPA Release 8 joint (20,10) channel coding of CQI information could be used for Carriers 1 and 2 and for Carriers 3 and 4.

Figure 13:
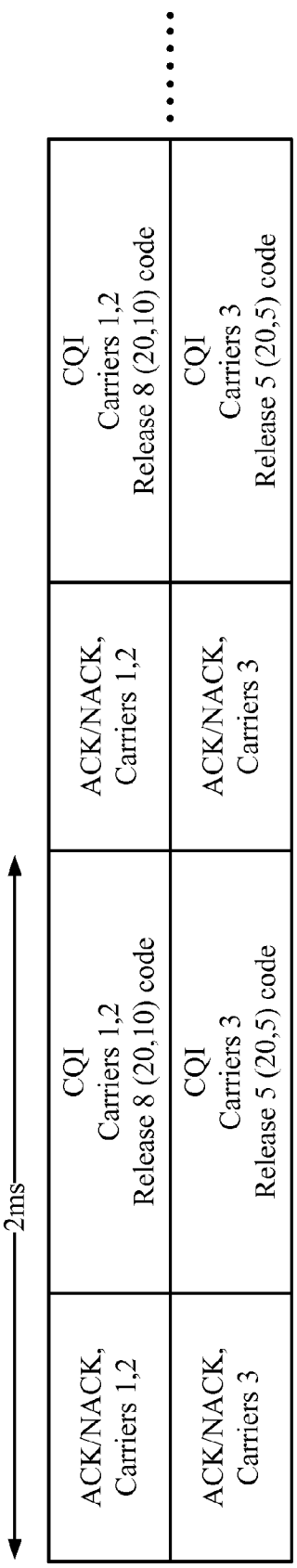
FIG. 13 is a timing diagram of a dual channelization code encoding information for three carriers.
Figure 14:
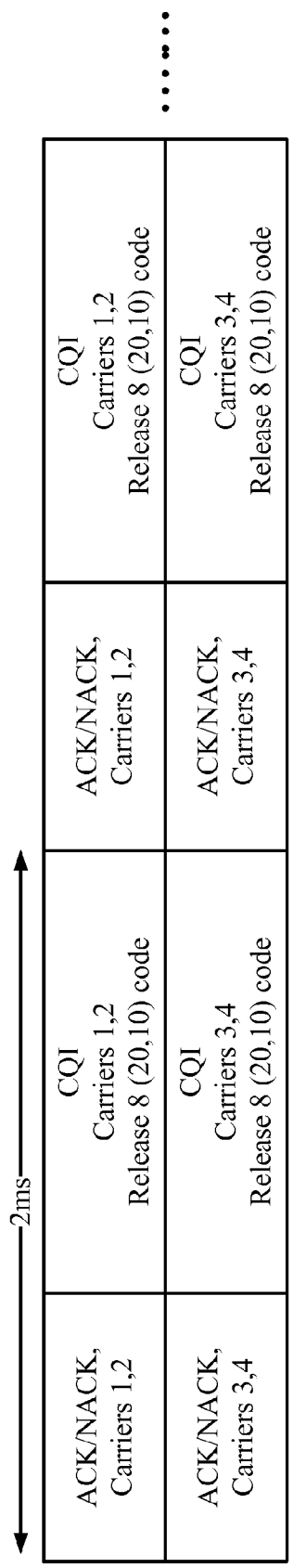
FIG. 14 is a timing diagram of a dual channelization code encoding information for four carriers.

In another embodiment, dual channelization codes are used. FIG. 13 illustrates a possible design when three carriers are aggregated and FIG. 14 illustrates a possible design when four carriers are aggregated. As seen in FIGS. 13 and 14, the ACK/NACK and CQI feedback information for up to two carriers are sent on a single channelization code and two such codes are transmitted in parallel to carry the feedback information for up to four carriers. Hence, when using dual channelization codes, in one embodiment, HS-DPCCH channel coding schemes already specified in previous releases are reused. For example, for three-carrier aggregation, Channelization Code 1 could include the DC-HSDPA Release 8 H-ARQ ACK/NACK channel coding for Carriers 1 and 2 and the DC-HSDPA Release 8 joint (20,10) channel coding of CQI information for Carriers 1 and 2, whereas Channelization Code 2 could include the Release 5 H-ARQ ACK/NACK channel coding for Carrier 3 and the Release 5 (20,5) channel coding of CQI information for Carrier 3. For four-carrier aggregation, Channelization Code 1 could include DC-HS-DPA Release 8 H-ARQ ACK/NACK channel coding for Carriers 1 and 2 and DC-HSDPA Release 8 joint (20,10) channel coding of CQI information for Carriers 1 and 2, whereas Channelization Code 2 includes the DC-HSDPA Release 8 H-ARQ ACK/NACK channel coding for Carriers 3 and 4 and DC-HSDPA Release 8 joint (20,10) channel coding of CQI information for Carriers 3 and 4.

An embodiment of HS-DPCCH design for the case for three or four carriers when MIMO is configured in two carriers is described below. Single channelization or dual channelization codes could be used for the ACK/NACK and CQI channels. As mentioned above, for four channels and MIMO on two of the channels, there are $$\left(\prod_{j=1}^{K}\sum_{i=0}^{P_j}2^i\right)-1=(1+2)(1+2)(1+2+4)(1+2+4)-1=440$$

possible H-ARQ responses, or 442 including PRE/POST. By exploiting redundancy, this number can be reduced by at least twenty percent without any loss of ambiguity.

Figure 15:
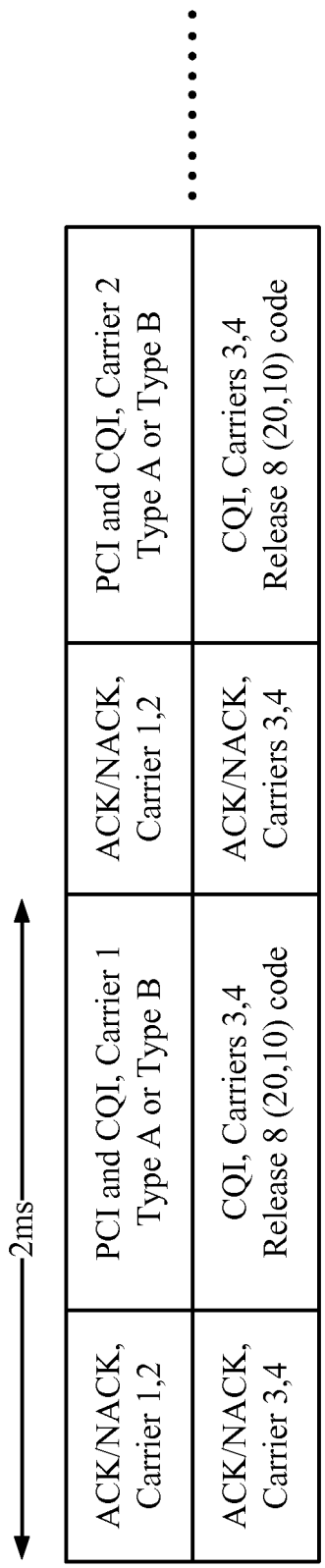
FIG. 15 is a timing diagram of another dual channelization code encoding information for three carriers.
Figure 16:
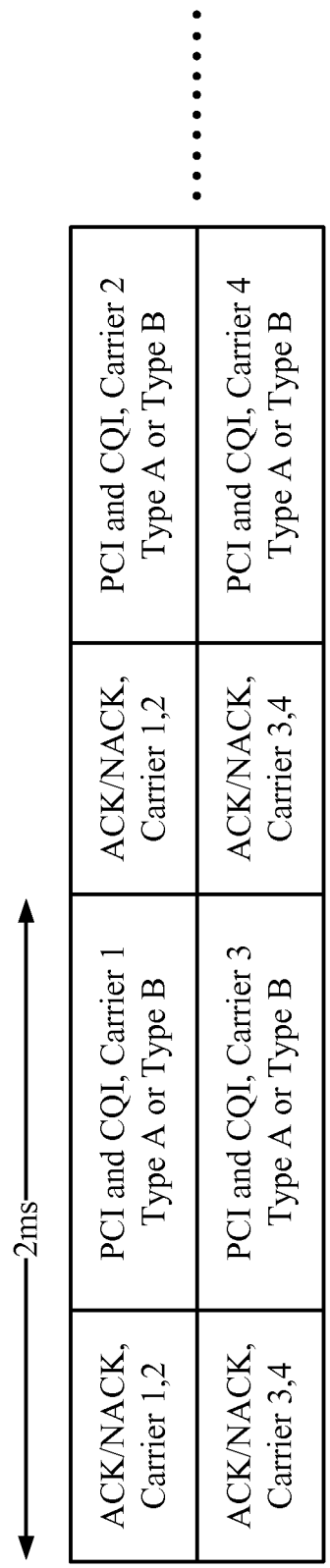
FIG. 16 is a timing diagram of another dual channelization code encoding information for four carriers.

FIG. 15 illustrates a dual channelization code based design for HS-DPCCH for the case when four carriers are aggregated and MIMO is configured in only two carriers. As shown in FIG. 15, the ACK/NACK feedback information for two carriers are sent on a single channelization code and two such channelization codes are transmitted in parallel to carry the feedback information for four carriers. The CQI information for the MIMO streams on Carrier 1 and Carrier 2 are sent in a TDM fashion on the first channelization code while the CQI information for Carriers 3 and 4 are jointly encoded on the second channelization code. Hence, when using dual channelization codes, one can reuse the HS-DPCCH channel coding schemes already specified in previous releases as well as the ACK/NACK channel coding scheme for DC-HSDPA and MIMO considered above. This dual channelization code scheme could potentially be extended to supporting MIMO being configured in all four carriers as illustrated in FIG. 16.

A design framework for HS-DPCCH for MC-HSDPA was presented above using the embodiments disclosed above for reducing the number of codewords used in H-ARQ. In some embodiments, a single channelization code design including joint coding of ACK/NACK information across multiple carriers and/or MIMO streams. This could allow reuse of existing CQI design as long as the minimum value of CQI Feedback cycle is set greater than one TTI (2 ms).

Figure 17:
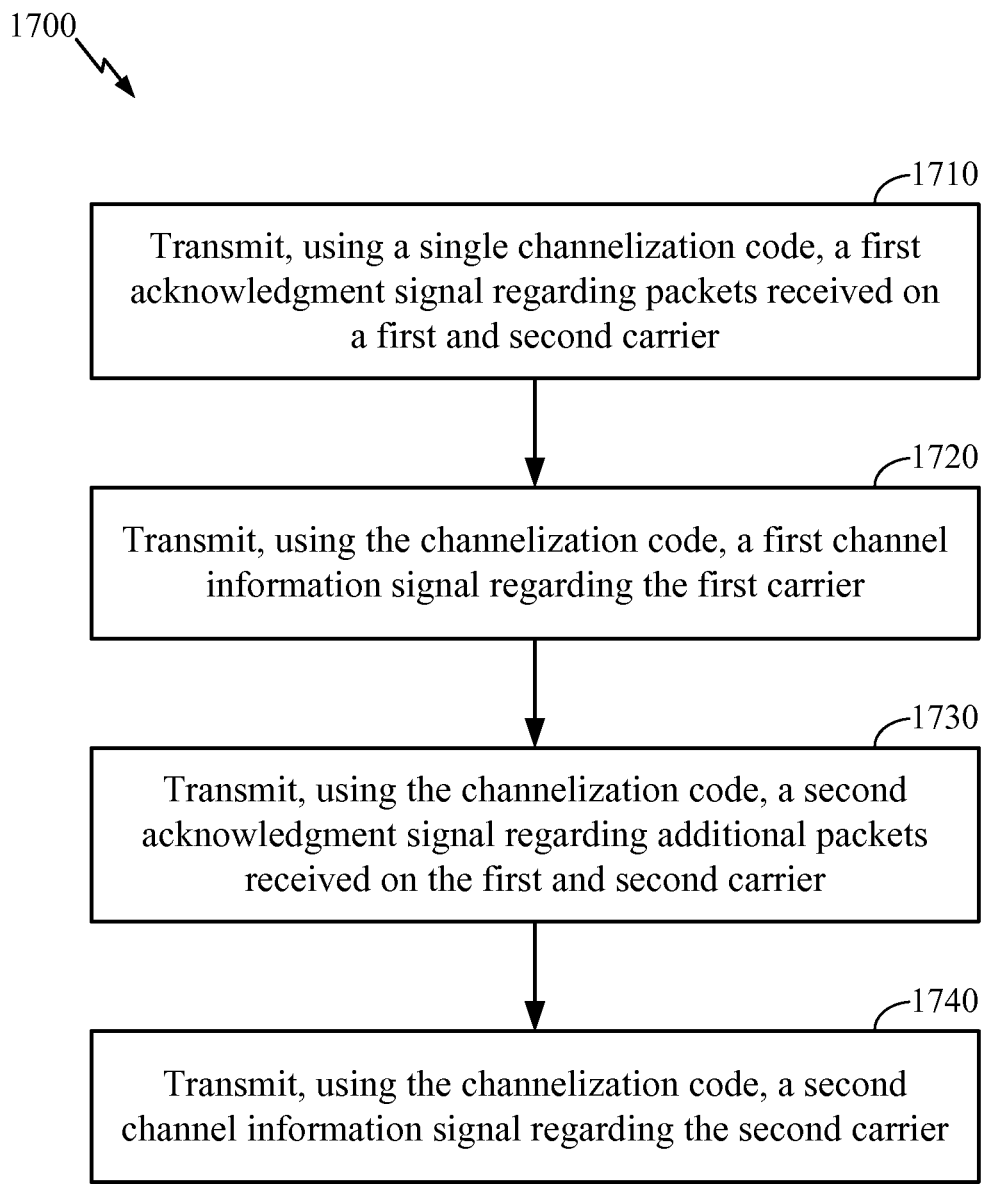
FIG. 17 is a flowchart illustrating a method of transmitting channel information.

Some of the timing diagrams shown above in FIGS. 9-16 fall under a general transmission scheme illustrated in the flowchart of FIG. 17. The process 1700 begins in block 1710 with the transmission, using a single channelization code, of a first acknowledgement signal regarding packets received on a first carrier and a second carrier. The transmission can be performed, for example, by the user equipment 100 of FIG. 1, and in particular, by at least one of the processor 110, modem 150, transceiver 160, or antenna 170 of the user equipment. The process continues, sequentially, to block 1720, 1730, and 1740 with the transmission, using the channelization code, of a channel information signal regarding the first carrier, a second acknowledgment signal regarding additional packets received on the first and second carrier, and a second channel information signal regarding the second carrier.

The timing diagram of FIG. 9 falls into the above-described transmission scheme as it begins with a ACK/NACK signal regarding Carriers 1 and 2, followed by CQI of Carrier 1, ACK/NACK of Carriers 1 and 2, and CQI of Carrier 2. The timing diagram of FIGS. 11 and 12 also fall into the above-described transmission scheme, where the first carrier is Carrier 1 and the second carrier is Carrier 3.

While the specification describes particular examples of the present invention, those of ordinary skill can devise variations of the present invention without departing from the inventive concept. Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The terms signal and threshold can depend upon the signal modulation technique. If pulse amplitude modulation (PAM) is used then the voltage amplitude or power of the signal represents its value. In that case the threshold is simply a power value. If phase shift keying is used, then the phase of the signal, which can translate to the sign of the received signal voltage can represent the signal value. In this case if the signal is integrated over multiple symbols, then the sign and amplitude of the received signal together indicate the signal value.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method of transmitting an acknowledgment codeword, the method comprising:
    during a first transmission cycle, detecting a first number of packets on a first communication link between a user device and a base station;
    detecting a second number of packets on a second communication link between the user device and the base station;
    determining, for each of the first number of packets and for each of the second number of packets, whether to acknowledge the packet;
    selecting, based on the acknowledgment determinations, a codeword from a codebook, the codebook comprising a set of codewords for acknowledging or not-acknowledging each of the first number of packets on the first communication link and the second number of packets on the second communication link, wherein the same set of codewords is also used for acknowledging or not-acknowledging each of a third number of packets on the first communication link and a fourth number of packets on the second communication link during a second transmission cycle, the third number of packets being different from the first number, the fourth number of packets being different from the second number, and the sum of the first and second numbers of packets being the same as the sum of the third and fourth numbers of packets; and
    transmitting the selected codeword from the user device to the base station.

2. The method of claim 1, further comprising:
    detecting, during the second transmission cycle, the third number of packets on the first communication link;
    detecting the fourth number of packets on the second communication link;
    determining, for each of the third number of packets and for each of the fourth number of packets, whether to acknowledge the packet;
    selecting, based on the determined acknowledgements for the third and fourth number of packets, another codeword from the set of codewords; and
    transmitting the selected other codeword from the user device to the base station.

3. The method of claim 2, wherein the codeword and the other codeword are the same codeword.

4. The method of claim 1, wherein at least one of the first or second communication link is a multiple-in-multiple-out (MIMO) link.

5. The method of claim 1, wherein the first number is one, the second number is one, the third number is two, and the fourth number is zero.

6. The method of claim 1, wherein the first number is one, the second number is two, the third number is two, and the fourth number is one.

7. A user device comprising:
    a memory configured to store an acknowledgement codebook comprising a plurality of acknowledgment codewords;
    a receiver configured to receive, during a first transmission cycle, a first number of packets via a first communication link between a base station and the user device and to receive a second number of packets via a second communication link between the base station and the user device;
    a processor configured to select one of the codewords based on the received packets and the sum of the first and second numbers of packets; and
    a transmitter configured to transmit the selected codeword to the base station.

8. A user device comprising:
    a receiver configured to receive, over a number (K) of active communication links between a base station and the user device, a maximum number $(p_1, p_2, \ldots, p_K)$ of packets on each of the active communication links;
    a memory configured to store an acknowledgment codebook having a number (C) of codewords, wherein $$C < \left( \prod_{j=1}^{K} \sum_{i=0}^{P_j} 2^i \right) - 1;$$

a processor configured to detect a number of packets on each of the active communication links, to determine whether to acknowledge each of the detected packets, and to select one of the codewords based at least in part on the determined acknowledgments; and
a transmitter configured to transmit the selected codeword to the base station.

9. The device of claim 8, wherein C is at least $$2^{\sum_{k=1}^{K} p_k - 1}$$

and less than $$\left(\prod_{j=1}^{K} \sum_{i=0}^{p_j} 2^i\right) - 1.$$

10. A user device comprising:
means for receiving, over a number (K) of active communication links between a base station and the user device, a maximum number ($p_1, p_2, \ldots, p_K$) of packets on each of the active communication links;
means for storing an acknowledgment codebook having a number (C) of codewords, wherein $$C < \left(\prod_{j=1}^{K} \sum_{i=0}^{p_j} 2^i\right) - 1;$$

means for detecting a number of packets on each of the active communication links, to determine whether to acknowledge each of the detected packets;
means for selecting one of the codewords based at least in part on the determined acknowledgments; and
means for transmitting the selected codeword to the base station.

11. A method of transmitting an acknowledgment codeword, the method comprising:
detecting a number of packets on each of a number (K) of active communication links between a base station and a user device, each active communication link having associated therewith a maximum number ($p_1, p_2, \ldots, p_K$) of packets;
determining, for each detected packet, whether to acknowledge the packet;
selecting, based on the determined acknowledgments, a codeword from a codebook having a number (C) of codewords, wherein $$C < \left(\prod_{j=1}^{K} \sum_{i=0}^{p_j} 2^i\right) - 1;$$

and
transmitting the selected codeword from the user device to the base station.

12. The method of claim 11, wherein C is at least $$2^{\sum_{k=1}^{K} p_k - 1}$$

and less than $$\left(\prod_{j=1}^{K} \sum_{i=0}^{p_j} 2^i\right) - 1.$$

13. A method of transmitting channel information, the method comprising:
transmitting, using a channelization code, a first channel information signal indicative of information regarding a first carrier;
transmitting, using the channelization code, a second channel information signal indicative of information regarding a second carrier; and
transmitting, between the transmission of the first and second channel information signals, using the channelization code, an acknowledgment signal acknowledging packets received on the first carrier and packets received on the second carrier.

14. The method of claim 13, wherein the first channel information signal is transmitted during a first Transmit Time Interval (TTI) and the second channel information signal is transmitted during a second TTI.

15. The method of claim 13, wherein the channel information comprises at least one of pre-coding information (PCI) or channel quality information (CQI).

16. A user device comprising:
a receiver configured to receive packets over at least a first carrier and a second carrier;
a transmitter configure to transmit, using a channelization code
a first channel information signal indicative of information regarding the first carrier,
a second channel information signal indicative of information regarding the second carrier, and
between the first and second channel information signals, using the channelization code, an acknowledgment signal acknowledging reception of the packets received on the first carrier and the second carrier.

17. A non-transitory computer-readable storage medium having instructions encoded thereon which, when executed by one or more processors, causes a computer to perform a method of transmitting channel information, the instructions comprising codes for:
transmitting, using a channelization code, a first channel information signal indicative of information regarding a first carrier;
transmitting, using the channelization code, a second channel information signal indicative of information regarding a second carrier; and
transmitting, between the transmissions of the first and second channel information signals, using the channelization code, an acknowledgment signal acknowledging packets received on the first carrier and received on the second carrier.

18. An apparatus in wireless communications, comprising:
during a first transmission cycle, means for detecting a first number of packets on a first communication link between a user device and a base station;
means for detecting a second number of packets on a second communication link between the user device and the base station;
means for determining, for each of the first number of packets and for each of the second number of packets, whether to acknowledge the packet;
means for selecting, based on the acknowledgment determinations, a codeword from a codebook, the codebook comprising a set of codewords for acknowledging or not-acknowledging each of the first number of packets on the first communication link and the second number of packets on the second communication link, wherein the same set of codewords is also used for acknowledging or not-acknowledging each of a third number of packets on the first communication link and a fourth number of packets on the second communication link during a second transmission cycle, the third number of packets being different from the first number of packets, the fourth number of packets being different from the second number of packets, and the sum of the first and second numbers of packets being the same as the sum of the third and fourth numbers of packets; and means for transmitting the selected codeword from the user device to the base station.

19. A non-transitory computer-readable storage medium having instructions encoded thereon which, when executed by one or more processors, causes a computer to perform a method of transmitting channel information, the instructions comprising codes for:
during a first transmission cycle, detecting a first number of packets on a first communication link between a user device and a base station;
detecting a second number of packets on a second communication link between the user device and the base station;
determining, for each of the first number of packets and for each of the second number of packets, whether to acknowledge the packet;
selecting, based on the acknowledgment determinations, a codeword from a codebook, the codebook comprising a set of codewords for acknowledging or not-acknowledging each of the first number of packets on the first communication link and the second number of packets on the second communication link, wherein the same set of codewords is also used for acknowledging or not-acknowledging each of a third number of packets on the first communication link and a fourth number of packets on the second communication link during a second transmission cycle, the third number of packets being different from the first number, the fourth number of packets being different from the second number of packets, and the sum of the first and second numbers of packets being the same as the sum of the third and fourth numbers of packets; and
transmitting the selected codeword from the user device to the base station.

20. A non-transitory computer-readable storage medium having instructions encoded thereon which, when executed by one or more processors, causes a computer to perform a method of transmitting an acknowledgment codeword, the instructions comprising codes for:
detecting a number of packets on each of a number (K) of active communication links between a base station and a user device, each active communication link having associated therewith a maximum number $(p_1, p^2, \ldots, p_K)$ of packets;
determining, for each detected packet, whether to acknowledge the packet;
selecting, based on the determined acknowledgments, a codeword from a codebook having a number (C) of codewords, wherein $$C < \left( \prod_{j=1}^{K} \sum_{i=0}^{p_j} 2^i \right) - 1;$$

and
transmitting the selected codeword from the user device to the base station.

21. An apparatus in wireless communications, comprising a transmitter configured for:
transmitting, using a channelization code, a first channel information signal indicative of information regarding a first carrier;
transmitting, using the channelization code, a second channel information signal indicative of information regarding a second carrier; and
transmitting, between the transmission of the first and second channel information signals, using the channelization code, an acknowledgment signal acknowledging packets received on the first carrier and packets received on the second carrier.

* * * * *